(12) United States Patent
Bussell et al.

(10) Patent No.: US 10,058,074 B1
(45) Date of Patent: Aug. 28, 2018

(54) PET WASTE COLLECTION AND DISPOSAL APPARATUS AND METHODS OF MAKING AND USING SAME

(71) Applicants: Ernie L. Bussell, Overland Park, KS (US); Elliott A. Bussell, Overland Park, KS (US)

(72) Inventors: Ernie L. Bussell, Overland Park, KS (US); Elliott A. Bussell, Overland Park, KS (US)

( * ) Notice: Subject to any disclaimer, the term of this patent is extended or adjusted under 35 U.S.C. 154(b) by 0 days.

(21) Appl. No.: 15/891,883

(22) Filed: Feb. 8, 2018

Related U.S. Application Data (60) Provisional application No. 62/456,197, filed on Feb. 8, 2017.

(51) Int. Cl.
*A01K 29/00* (2006.01)
*A01K 23/00* (2006.01)
*A01K 27/00* (2006.01)

(52) U.S. Cl.
CPC .......... *A01K 23/005* (2013.01); *A01K 27/008* (2013.01); *A01K 27/004* (2013.01)

(58) Field of Classification Search
CPC ............................ E01H 1/1206; A01K 23/005
USPC .............................. 294/1.3, 1.4, 1.5, 176, 177
See application file for complete search history.

(56) References Cited

U.S. PATENT DOCUMENTS

| 6,076,717 A * | 6/2000 | Edwards ............... A01K 27/004 |
| | | 225/106 |
| 9,975,660 B2 * | 5/2018 | Cartledge .......... B65D 21/0228 |
| 2007/0108781 A1 * | 5/2007 | Edwards ............... A01K 27/006 |
| | | 294/1.3 |
| 2008/0179902 A1 * | 7/2008 | Phillips ................. E01H 1/1206 |
| | | 294/1.3 |
| 2013/0125834 A1 | 5/2013 | Gee |
| 2014/0062108 A1 * | 3/2014 | Burke ................. A01K 23/005 |
| | | 294/1.3 |
| 2014/0183886 A1 * | 7/2014 | Hollett ................. A01K 1/0114 |
| | | 294/1.3 |
| 2016/0052712 A1 * | 2/2016 | Jackson-Tyree ...... E01H 1/1206 |
| | | 294/1.3 |

OTHER PUBLICATIONS

Pet Poop Pod, The Clean, Convenient Way to Carry and Dispose of Your Pet's Poop, www.petpooppod.com, dated May 8, 2018, 11 pAges.

* cited by examiner

*Primary Examiner* — Paul T Chin
(74) *Attorney, Agent, or Firm* — Lathrop Gage L.L.P.

(57) ABSTRACT

An apparatus for collecting and disposing pet waste comprises a sleeve having a body and a cover which collective define an uninterrupted cavity. The sleeve has an openable member, the body has an open terminal end, and the cover has an eyelet for dispensing bags. The apparatus has a receptacle removably secured within the cavity. The receptacle has a closed end on one side and a lid comprising a cap on the other. The cap has a snap projection and the lid has a snap groove to allow the cap to be snapped opened and closed. A length of the receptacle is greater than a length of the body such that when the receptacle is secured within the cavity, at least a part of the lid extends beyond the terminal end and the closed end is adjacent the openable member such that a waste bag roll can be placed thereon.

20 Claims, 4 Drawing Sheets

PET WASTE COLLECTION AND DISPOSAL APPARATUS AND METHODS OF MAKING AND USING SAME

CROSS REFERENCE TO RELATED APPLICATIONS

This application claims priority to U.S. Provisional Patent Application Ser. No. 62/456,197 filed Feb. 8, 2017. The disclosure of the '197 Application is incorporated by reference herein in its entirety.

FIELD OF THE DISCLOSURE

The disclosure relates generally to the field of pet waste collection devices. More specifically, the disclosure relates to a portable apparatus for collecting pet waste and conveniently disposing of same. The apparatus is configured for the removable securement of a leash for walking, running, or otherwise traveling with the pet.

SUMMARY

Systems and methods for collecting and disposing pet waste are disclosed herein. In an embodiment, an apparatus for collecting and disposing pet waste comprises an elastic sleeve having a cylindrical body, a cover disposed above the body, and an openable member. The body and the cover collectively define a cavity. The body has a terminal end that is open. The cover has an eyelet. The cavity is uninterrupted and is accessible via each of the terminal end, the eyelet, and the openable member. The apparatus includes a receptacle configured to be removably secured within the cavity. The receptacle has a closed end on one side and a lid comprising a cap on the other. The cap has a snap projection and the lid has a snap groove. The snap projection and the snap groove are configured to collectively allow the cap to be snapped open and closed. A length of the receptacle is greater than a length of the body such that when the receptacle is removably secured within the cavity: (a) at least a part of the lid extends beyond the terminal end; and (b) the closed end is adjacent the openable member to allow for a roll of waste bags to be situated on the closed end. The eyelet is configured to allow for the dispensation of one waste bag in the roll of waste bags.

In another embodiment, an apparatus for collecting and disposing pet waste comprises a sleeve having a body, a cover disposed above the body, and an openable member beneath the cover. The body and the cover collectively define a cavity. The body has a terminal end that is open. The cavity is uninterrupted and is accessible via each of the terminal end, the eyelet, and the openable member. The apparatus includes a receptacle configured to be removably secured within the cavity. The receptacle has a closed end on one side and a lid comprising a cap on the other. The cap has a snap projection and the lid has a snap groove. The snap projection and the snap groove are configured to collectively allow the cap to be snapped open and closed. A length of the receptacle is greater than a length of the body such that when the receptacle is removably secured within the cavity: (a) at least a part of the lid extends beyond the terminal end; and (b) the closed end is adjacent the openable member to allow for a roll of waste bags to be situated on the closed end.

According to yet another embodiment, a method of collecting and disposing of pet waste comprises providing a waste collection apparatus. The apparatus comprises an elastic sleeve having a cylindrical body, a cover disposed above the body, an openable member, and at least two fastening members. The body and the cover collectively define a cavity. The body has a terminal end that is open. The cover has an eyelet. The cavity is uninterrupted and is accessible via each of the terminal end, the eyelet, and the openable member. The apparatus includes a receptacle configured to be removably secured within the cavity. The receptacle has a closed end on one side and a lid comprising a cap on the other. The method includes the step of situating the receptacle within the cavity such that the cap faces away from the cover, and the step of securing a locking strip on a housing of a retractable leash attachment. The method comprises securing the retractable leash attachment to the elastic sleeve such that one of the at least two fastening members passes through an opening in a handle of the retractable leash attachment and another of the at least two fastening members is secured to the locking strip.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Pet ownership is on the rise. Sources indicate that fifty-six percent of the global population has at least one pet. Pet ownership is even more common in the United States. The 2017-2018 National Pet Owners Survey provides that sixty-eight percent of households in the United States now own a pet. This percentage is up from fifty-six percent in 1988, when the Pet Ownership Survey was first conducted. Indeed, the United States has more dogs and more cats than any other country in the world. This rise in pet ownership has led to a flood of pet accessories in the marketplace. A pet owner may purchase, e.g., a leash, a collar, a tag, a garment, etc. for his or her pet. Pet owners, and particularly those having dogs, cats, and other such animals, may also purchase waste bags for collecting and disposing of their pet's fecal matter.

As is known, a pet such as a dog, cat, or other such animal may excrete fecal matter one or more times a day. For example, the pet owner may be walking the pet in the park and the pet may defecate in the park. Or, for instance, the pet owner may be walking (or otherwise playing with) the pet in his or her neighborhood and the pet may defecate on the street or elsewhere. The pet owner may desire to clean up after the pet, e.g., because of social responsibility concerns, environmental concerns, and/or because the applicable law requires the pet owner to do so, etc. To this end, the pet owner may carry on his person (e.g., in his hand or in the pocket of a garment) one or more soft garbage bags. When the pet defecates, the pet owner may place the garbage bag on his hand, pick up the fecal matter, and tie the garbage bag with a knot. The pet owner may then carry the garbage bag in one hand and the pet leash in the other and walk to a nearby trashcan. The pet owner may then dispose the garbage bag in the trashcan to free one of his hands and resume walking the pet.

Cleaning up after the pet in this conventional manner may be suboptimal. If the pet defecates and no trash receptacle is nearby, the pet owner may be forced to pick up the fecal matter in the garbage bag and carry that bag for a relatively long period of time until he or she comes across a trashcan. Handling the garbage bag in one hand and the pet leash in the other hand for an extended period of time may be undesirable (e.g., may render the user incapable of using one of his or her hands to drink water from a bottle, to pick up the phone, to change the song playing on a music playing device, etc.). Further, carrying the garbage bag in this fashion may appear unsightly. There may also be a risk of breakage of the garbage bag—particularly where the owner is jogging, running, or otherwise traveling quickly—which may be unsanitary and undesirable. The present disclosure relates, in general to a portable pet waste collection and disposal apparatus 100 which may, in embodiments, remedy such problems. Specifically, the pet waste collection and disposal apparatus 100 may allow the pet owner to collect the pet's fecal matter therein. The apparatus 100 may secure the garbage bag containing the fecal matter, may hide it from view, and may alleviate any concerns relating to breakage of the garbage bag. Importantly, the pet waste collection and disposal apparatus 100 may be configured so as to allow the pet owner to handle both the leash and the apparatus 100 with the same hand. Such may allow the user to use his or her other hand as desired.

Figure 1:
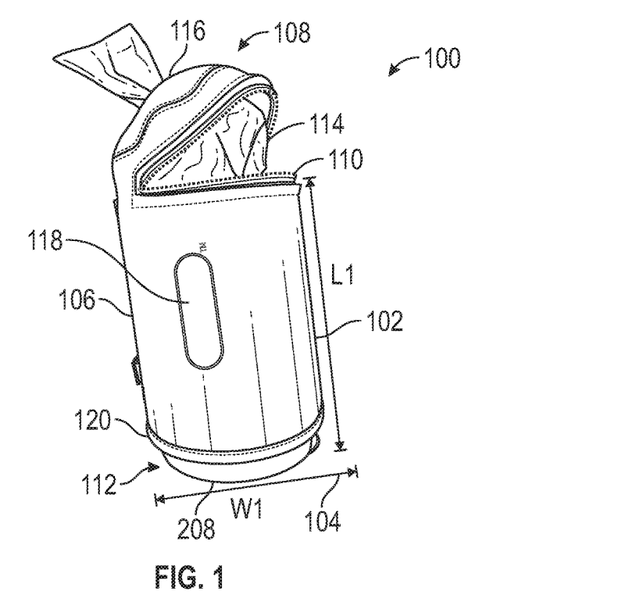
FIG. 1 is a side perspective view of a pet waste collection and disposal apparatus, according to an example embodiment.

Focus is directed now to FIGS. 1-5, which show the apparatus 100 according to one example embodiment. The pet waste collection and disposal apparatus 100 may include a sleeve 102 and a container (or receptacle) 104. As discussed herein, and as shown in FIG. 1, the sleeve 102 may be configured to hold the container 104.

In more detail, the sleeve 102 may include a body portion 106 and a cover portion 108 disposed above the body portion 106. The body portion 106 and the cover portion 108 may be of unitary construction (e.g., be formed integrally). The sleeve 102 may include a closeable member 110 that extends about halfway around the cylindrical body 106. The portion of the sleeve 102 which in the vertical plane is adjacent and extends beneath the closable member 110 may be generally referred to as the body portion 106 herein. The portion of the sleeve 102 which in the vertical plane is above the closable member 110 may be referred to herein as the cover portion 108.

The body 106 may have a terminal (or lower) end 112. The terminal end 112 may be open and may provide access to a cavity 114 defined collectively by the body 106 and the cover portion 108. The cavity 114 may likewise be accessed by opening the closable member 110 (and through an eyelet in the cover portion 108 as discussed herein). In an embodiment, the cavity 114 extends all the way from the terminal end 112 of the body 106 to an upper end 116 of the cover portion 108. In these embodiments, the cavity 114 is substantially uninterrupted (e.g., is devoid of any divider that divides the cavity 114).

The sleeve 102 may, in embodiments, be a compression sleeve. That is, the sleeve 102, and particularly the body 106 thereof, may comprise materials that are configured to be elastic. As discussed herein, the receptacle 104 may be sized so as to be readily insertable into the cavity 114 (i.e., the receptacle 104 may be inserted into the cavity 114 through the body terminal end 112 such that it is surrounded by the body 106 at least in part and held by the body 106). The elastic constitution of the compression sleeve 102, and particularly of the body 106 thereof, may ensure that the receptacle 104, once inserted into the cavity 114, does not unintentionally come out of same even where the user is running, walking, or otherwise causing the apparatus 100 to move rapidly. Of course, the compression sleeve 102 may be configured so as to allow the receptacle 104 to be purposely pulled out of the compression sleeve 102 (e.g., for the cleaning of the receptacle 104) conveniently. The compression sleeve 102, e.g., the body 106 thereof, may comprise stretch fabric, neoprene, rubber composite, and/or other desirable materials. In one currently preferred embodiment, the sleeve 102 comprises neoprene. In embodiments, the sleeve 102 may optionally include an elastic band proximate the terminal end 112 of the body 106 which ensures that the receptacle 104 remains within the cavity 114 once it is slidably disposed therein; in these embodiments, the body 106 may but need not be made of elastic materials. The artisan will understand that the body 106 and the cover portion 108 may be made of the same or different materials.

The body 106, in embodiments, may include an indicia portion 118. The indicia portion 118 may be an ellipse, a circle, a square, or take on any other regular or irregular shapes. The indicia portion 118 may be configured to receive indicia (e.g., indicia such as a logo or other indicia may be printed on the indicia portion 118). The apparatus 100 may therefore be used by corporations and/or others for advertisement, e.g., as corporate giveaways. In some embodiments, a user may personalize the apparatus 100 by placing unique indicia on the indicia portion 118 (or elsewhere on the compression sleeve 102). In embodiments, the indicia portion 118 may be metallic or may be otherwise be configured for the securement of magnetized objects (e.g., a magnetized logo, magnetized indicia, etc.). In some embodiments, the indicia portion 118 may be magnetized such that metallic indicia may be conveniently secured thereon.

In embodiments, the body 106, proximate the terminal end 112 thereof or elsewhere, may include reflective materials. For example, in an embodiment, a band 120 comprising reflective fabric may be sewn or otherwise secured to the sleeve 102 proximate the terminal end 112 thereof. Alternately or in addition, the reflective materials may comprise reflective paint, reflective tape, etc. This feature may enhance safety during low-light conditions. In embodiments, lights (e.g., low powered lights such as LEDs) may be affixed to the sleeve 102 and the user may power these on to ensure that the apparatus 100 (and thus the user associated with the apparatus 100) is visible during night and other low light conditions.

Figure 2:
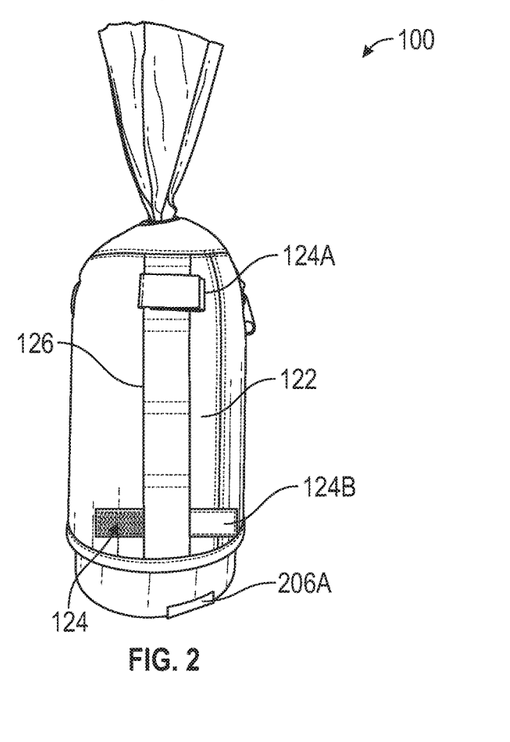
FIG. 2 is a rear perspective view of the pet waste collection and disposal apparatus of FIG. 1.

The body 106, at a back side 122 thereof (FIG. 2), may comprise one or more fastening members 124. For example, as shown in FIG. 2, the body back side 122 may include a fastening member 124A proximate the cover portion 108 and a fastening member 124B proximate the terminal end 112. The fastening members 124A and 124B may extend away from the body 106 (herein, "projecting fasteners") and may be openable and closable. For example, in embodiments, the fastening members 124A and 124B may comprise hook and loop fasteners (such as Velcro®, 3M™ dual lock fasteners, etc.). As discussed herein, the fastening members 124A and 124B may allow different objects, and in particular, different types of pet leashes, to be tightly but removably secured to the sleeve 102. The artisan will readily understand from the disclosure herein that the fastening member 124A in FIG. 2 is closed whereas the fastening member 124B is illustrated as being open.

In embodiments, in addition to or in lieu of the projecting fasteners 124, the body 106, e.g., at the back side 122 thereof, may include fastening members 126. The fastening members 126 may extend generally horizontally along the length of the body 106 and ends thereof may be secured to the body 106 such that an object (e.g., a leash or other object) may be passed therethrough to secure said object to the body 106. In embodiments, the fastening members 124 and 126 may be interwoven or otherwise interlaced. For example, in embodiments, the projecting fastening members 124A and 124B may each comprise a strap having hooks (or loops) and an underside of the fastening members 126 may comprise corresponding loops (or hooks) to allow the projecting fastening members 124A and 124B to be secured to the fastening members 126 such that a portion of each of the fastening members 124A and 124B is sandwiched between the body 106 and the fastening members 126 and locked to the fastening members 126. Such may allow the fastening members 124A and 124B to be situated underneath the fastening members 126 and locked thereto at different portions of the body (e.g., at a position different from the position of the fasteners 124A and 124B shown in FIG. 2).

Figure 3:
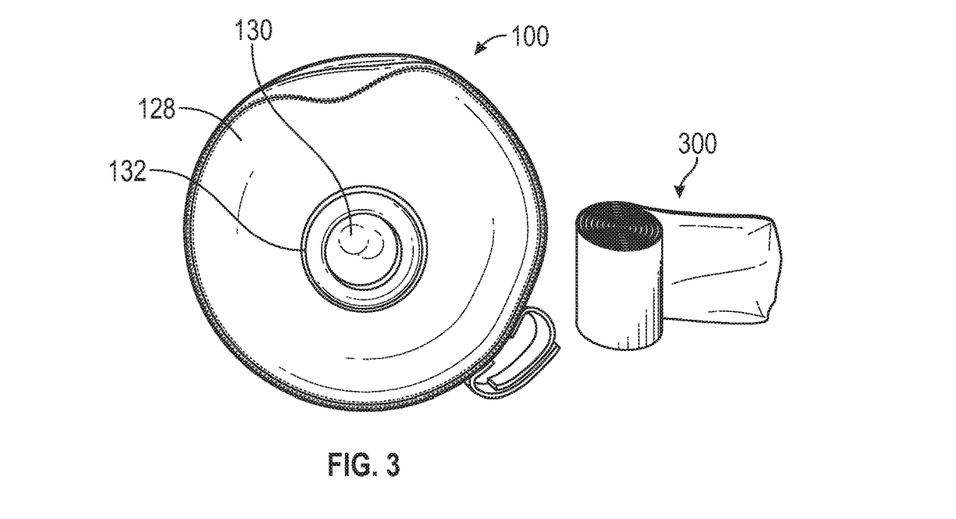
FIG. 3 is a top view of the pet waste collection and disposal apparatus of FIG. 1 shown together with a roll of waste bags configured to be stored within the pet waste collection and disposal apparatus of FIG. 1.

The cover portion 108 may, at a top side 128 thereof, include an opening 130 (FIG. 3). The opening 130 may be generally circular or take on other regular or irregular shapes. In an embodiment, a grommet (e.g., a ring of metal, rubber, etc.) 132 may line the opening 130 to ensure that the opening 130 does not enlarge over time due to the dispensation of waste bags (discussed below). The opening 130 may provide access to the sleeve cavity 114. The opening 130 and the grommet 132 may collectively be referred to herein as an eyelet. The eyelet may allow a waste bag to be readily retrieved from the compression sleeve 102 for use, without the need to open the closable member 110.

Figure 5:
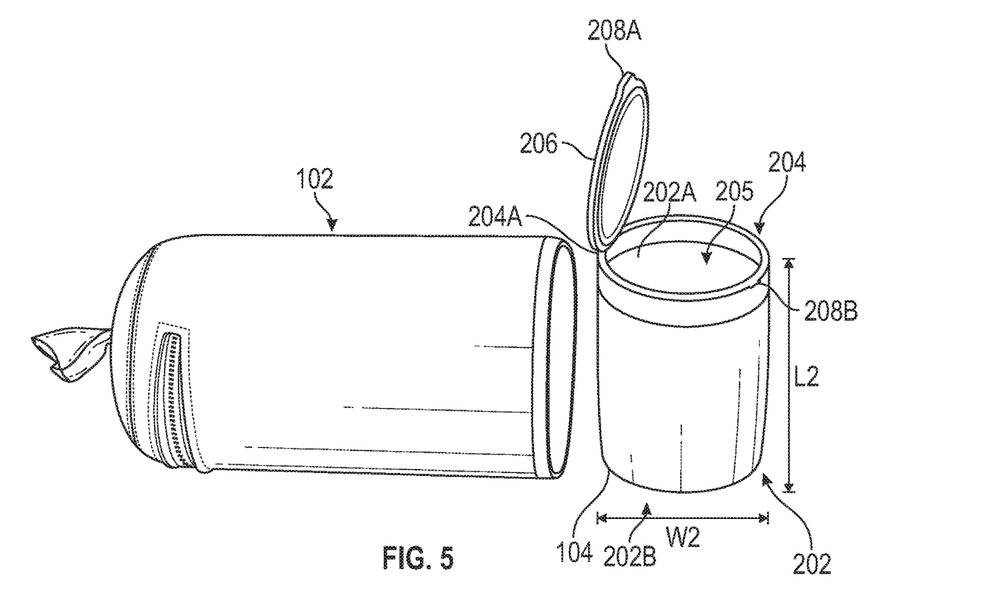
FIG. 5 shows a perspective view of a compression sleeve of the pet waste collection and disposal apparatus of FIG. 1 together with a pet waste collection container thereof.

The receptacle 104, which is shown outside the sleeve 102 in FIG. 5, may have a body 202 and a lid portion 204. The body 202 may have an openable end 202A and a closed end 202B. The body 202, akin to the body 106 of the sleeve 102, may be generally cylindrical and define a cavity 205 that is accessible via the lid portion 204. The cavity 205 may extend uninterruptedly from the open end 202A to the closed end 202B. In an embodiment, the receptacle body 202 may be generally transparent, which may allow a user to easily view the contents of the receptacle 104 without having to open the openable end 202A.

The receptacle lid portion 204 may be generally cylindrical and have a cap 206. The lid portion 204 may be removably secured to the mouth of the body 202 to close off the cavity 205. For example, the mouth of the body 202 may have external threadings and the lid portion 204 may have corresponding internal threadings that allow the lid portion 204 to be threadingly coupled to the body 202. Alternately, the lid portion 204 may be configured to be removably coupled to the body 202 in other ways (e.g., lid portion 204 may be configured to be slid onto the mouth portion of the body 202 to close the body 202).

The cap 206 of the lid portion 204 may be pivotally coupled thereto, e.g., at a distal end 204A thereof (i.e., the cap 206 may be a hinged cap coupled to the lid portion 204 via a hinge 206A (FIG. 2)). The cap 206 may be generally circular and may be openable (i.e., at least a portion thereof may be distanced from the lid portion 204) to provide access to the cavity 205. In an embodiment, the cap 206 may have a snap projection 208A and the lid portion 204 may have a snap groove 208B which collectively allow the cap 206 to be snapped shut to close off the cavity 205. A user may push up on the snap projection 208A, e.g., using his thumbnail, fingernail, or otherwise, to cause the cap 206 to snap open, which may allow the receptacle cavity 205 to become accessible (as shown in FIG. 5). That is, the user may apply a force on the snap projection 208 to cause it to open and travel away from the lid portion 204. The user may likewise push the cap 206 towards the lid portion 204 to cause the snap projection 208A to interact with the snap groove 208B to close off the cavity 205. The artisan will appreciate from the disclosure herein that the receptacle cavity 205 may be accessed by: (a) disassociating the lid portion 204 from the body 202 (e.g., unthreading the lid portion 204 from the body 202); and/or (b) opening the cap 206 of the lid while the lid portion 204 is secured (e.g., is threadingly or otherwise secured) to the body 202. In embodiments, the cap 206 may be configured such that the user may conveniently open and close same with one hand.

Figure 4:
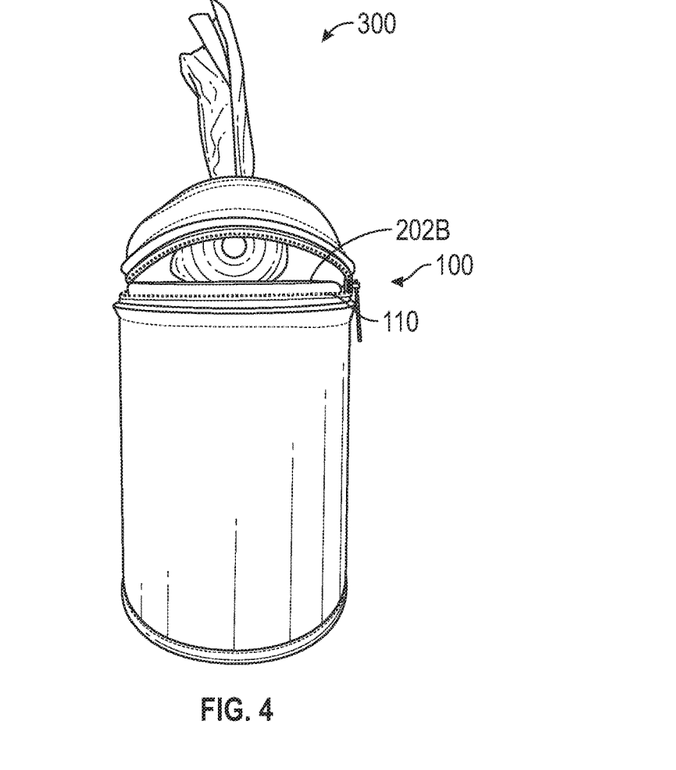
FIG. 4 is a front perspective view of the pet waste collection and disposal apparatus of FIG. 1, showing the roll of bags of FIG. 3 being stored within the pet waste collection and disposal apparatus of FIG. 1.

The sleeve 102, and particularly the body 106 thereof, may be configured so as to allow the receptacle 104 to be inserted therein. Specifically, as shown in FIGS. 1, 2, and 4, the receptacle 104 may be inserted into the sleeve body 106 such that the bottle lid portion 208 faces away from the cover portion 108 of the sleeve 102 and the receptacle closed end 202B is within the sleeve cavity 114 adjacent the closable member 110 and faces the sleeve cover portion 108. The sleeve body 106 may have a length L1 and a width W1 (FIG. 1). In an embodiment, the length L1 and the width W1 may be about 5 inches and 2.5 inches, respectively. Of course, the sleeve body 106 may also have other dimensions (e.g., be longer, shorter, wider, etc.). The receptacle 104 may have a length L2 and a width W2 (see FIG. 5). In embodiments, the length L2 may be slightly greater than the length L1 (e.g., be 5% or so greater than L1). Thus, when the receptacle 104 is inserted into the sleeve cavity 114 such that the receptacle closed end 202B is proximate and generally coplanar with the closable member 110, the receptacle 104, and specifically a part of the lid portion 204 thereof (including the cap 206), may extend beyond the terminal end 112 of the sleeve 102, as shown in FIG. 1. This may allow the user to conveniently open the cap 206 with one hand (e.g., by pushing on the snap projection 208A to cause the snap projection 208A to disassociate from the snap groove 208B) while the receptacle 104 is removably secured within the cavity 114 of the sleeve 102.

In embodiments, W2 may also be slightly greater than W1 (e.g., be 5% or so greater than W1). Such may ensure that the receptacle 104, once inserted into the cavity 114 of the elastic sleeve 102, remains secured therein despite rapid or other movement of the apparatus. Of course, as discussed herein, the receptacle 104 may be purposely pulled out of the sleeve cavity 114 when desired.

Waste bags 300 (FIG. 3) configured to be used with the apparatus 100 may be in roll form as shown, and as known, may be removably coupled to each other in an end-to-end configuration. Once the receptacle 104 is inserted into the sleeve cavity 114 as discussed herein, the closable member 110 may be opened and the waste bag roll 300 may be disposed within the sleeve cavity 114 such that it rests atop the receptacle bottom (i.e., closed) end 202B. A part of one of the waste bags from the waste bag roll 300 may be passed through the opening 130 (much like one tissue paper is partially pulled out of a tissue paper box to afford convenient access to the tissue papers that will subsequently be sequentially retrieved), and the user may pull (and thereafter detach this waste bag for use) to cause a part of another waste bag from the waste bag roll 300 to extend through the opening 130. In this way, the user may have a waste bag at the ready until the roll 300 is depleted from use.

A method of using the apparatus 100 will now be described with reference to FIGS. 1-5. The user may first place the receptacle 104 within the sleeve cavity 114 such that the lid of the receptacle 104 faces away from the sleeve cover portion 108. As noted, in embodiments, the receptacle 104 may be inserted into the sleeve cavity 114 such that the cap 206 of the lid portion 204 extends beyond the terminal end (e.g., extends underneath the sleeve terminal end 112 as shown in FIG. 1). Once the receptacle 104 is so inserted into the sleeve cavity 114, the user may open the closable member 110 to access the sleeve cavity 114 and situate the waste bag roll 300 atop the receptacle closed end 202B (see FIG. 4). The waste bag roll 300 may rest on the receptacle closed end 202B. The user may then cause all or part of one of the waste bags in the waste bag roll to extend out through the opening 130 in the cover portion 108, as shown in FIG. 4, and close the closable member 110 thereafter.

When the pet excretes fecal matter, the user may first open the cap 206 of the receptacle 104 within the sleeve cavity 114, e.g., by placing his fingernail, thumbnail, etc., adjacent the snap projection 208A and applying a force thereon. The user may then pull on the waste bag extending through the opening 130 and cause same to disassociate from the waste bag roll 300. The artisan will understand that the user may also disassociate the waste bag from the roll 300 prior to opening the receptacle cap 206.

The user may then collect the fecal matter in the disassociated waste bag and place the waste bag containing the fecal matter in the receptacle cavity 205 via open cap 206. The user may then close the cap 206 to secure the waste bag containing the fecal matter within the receptacle 104. When the user comes across a trash can, the user may open the cap 206 again and empty the contents of the receptacle 104 into the trashcan (e.g., the user may allow the contents to fall into the trash can by virtue of gravity). The artisan will appreciate that the user need not take the receptacle 104 out of the sleeve cavity 114 and/or disassociate (e.g., unthread) the lid portion 204 from the receptacle body 202 to collect and/or dispose of the waste bag. In this way, the waste bag containing the fecal matter may remain secured within the receptacle and be hidden from view until the user disposes of same in the trash can (or elsewhere). Further, while there is little risk of breakage of the waste bag within the receptacle 104, even if the bag was to break, the contents thereof may remain secured within the receptacle 104 until emptied out by the user. While not required, the user may from time to time remove the receptacle 104 from the sleeve cavity 114, uncouple the lid portion 204 from the receptacle body 202, and wash the receptacle 104. The receptacle 104 may, in embodiments, be dishwasher safe. The sleeve 102 may be configured to be hand or machine washed, or may in embodiments be washed in a dishwasher.

Figure 6:
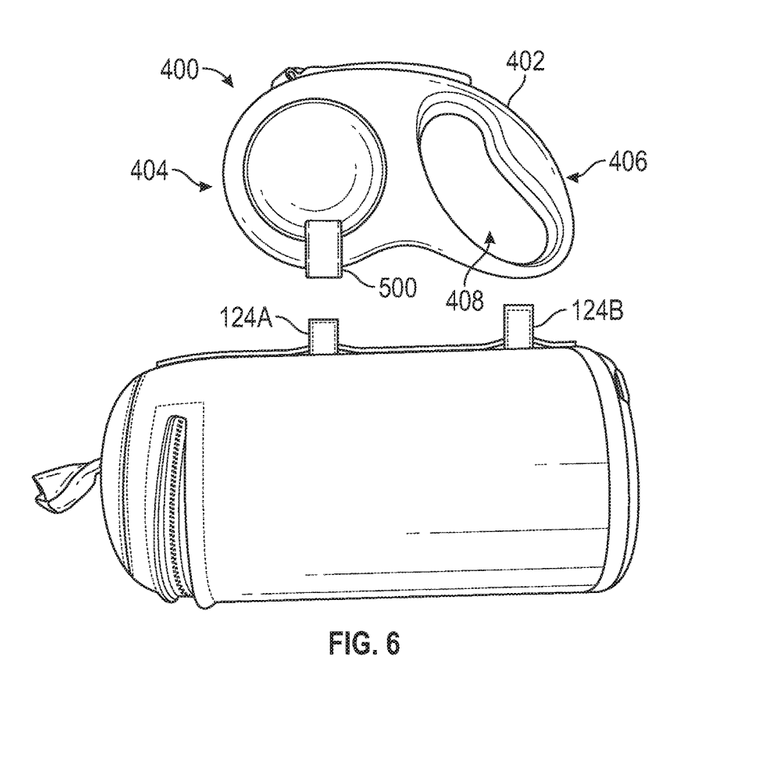
FIG. 6 shows a perspective view of a retractable pet leash configured to be removably secured to the pet waste collection and disposal apparatus of FIG. 1.
Figure 7:
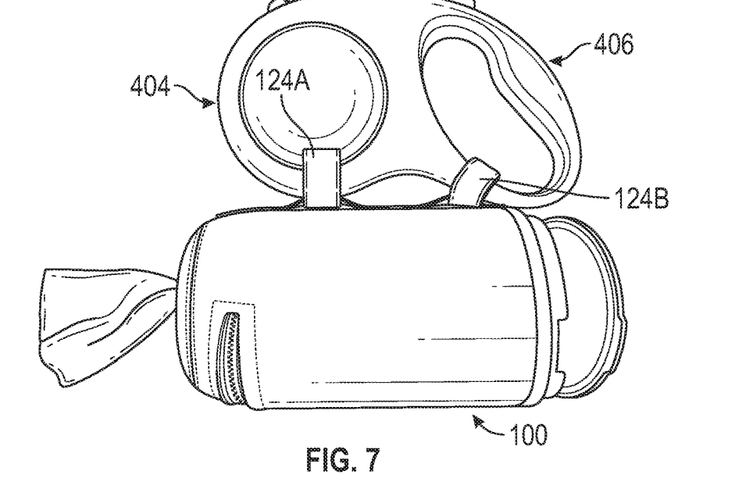
FIG. 7 shows a perspective view of the pet waste collection and disposal apparatus of FIG. 1 having the retractable pet leash of FIG. 6 removably secured thereto.
Figure 8:
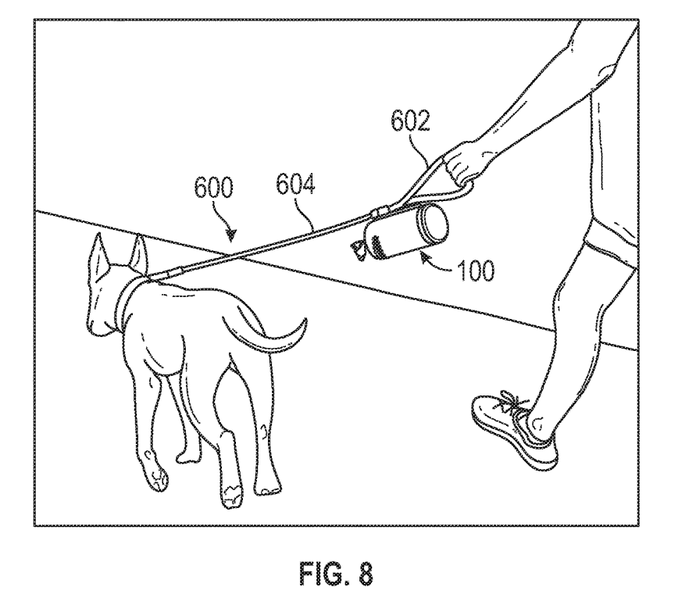
FIG. 8 shows a perspective view of the pet waste collection and disposal apparatus of FIG. 1 having a standard pet leash removably secured thereto.

As noted, the straps 124 and/or 126 may be configured to allow various types of leashes to be removably secured to the apparatus 100. Attention is directed now to FIGS. 6-8 to illustrate this feature of the disclosure.

FIG. 6 shows a retractable leash attachment 400. As is known, and as shown in FIG. 6, the retractable leash attachment 400 has a housing 402 having a belt containing portion 404 and a handle 406. The belt containing portion 404 may house a retractable belt. The handle 406 may define an opening 408 within the housing 402. A user may place his hand within the opening 408 to grab the handle 406 while the retractable belt (not expressly shown in FIG. 6) is situated on a collar around the neck of the pet.

The opening 408 in the retractable leash attachment 400 may be a solitary opening. If the retractable leash attachment 400 is secured to the apparatus 100 via this opening 408 (i.e., by passing the projecting fastener 124A or 124B through this opening and closing same around the handle 406 (see FIG. 7)), the leash attachment 400 may have a lot of play (i.e., move relative to the apparatus 100). Such may be undesirable and cause user discomfort while he is walking or otherwise traveling with the pet. To alleviate such concerns, the user may wish to also secure the belt containing portion 404 of the housing 402 to the apparatus 100. To effectuate such securement, the user may first secure a strip 500 (herein, "a locking strip") of a hook and/or loop fastener (see FIG. 6) to the belt containing portion 404 via adhesive or other means. In embodiments, the user may secure the strip 500 to the belt containing portion 404 in a U-shape such that the strip 500 extends to both sides of the belt containing portion 404 (i.e., the side of the belt containing portion 404 visible in FIG. 6, and the side thereof opposite the visible side). Once this is done (see FIG. 6), the user may pass one of the projecting fasteners 124 (e.g., fastener 124B) through the handle opening 408 and tightly close said fastener 124B around the handle 406. The user may then secure the other projecting fastener (e.g., fastener 124A) to the U-shaped strip 500 to cause the belt containing portion 404 to also be firmly secured to the sleeve 102. In this way, the retractable leash attachment 400 may be secured to the sleeve 102 at two points. The artisan will understand that this configuration may allow the retractable leash attachment 400 to be secured to the body without significant play. The lack of play between the retractable leash attachment 400 and the sleeve 102 may translate into increased comfort for the pet owner while walking or running with his or her pet.

In use, the user may place the retractable belt on a collar situated around the neck (or elsewhere on the pet) and, as is conventional, hold the handle of leash attachment 400 with his hand while walking, running, or otherwise accompanying the pet. The apparatus 100 may remain firmly secured to the leash attachment 400 by virtue of the projecting fasteners 124A and 124B, thus alleviating the need for the user to carry garbage bags containing fecal matter in his other hand. As will be understood, when the pet defecates, the user may detach a trash bag from the roll 300, open the receptacle cap 206 as described above while the apparatus 100 is secured to the leash, and close the cap 206 after collecting the fecal matter in the bag and storing same in the receptacle cavity 205. The user may thereafter empty the contents of the receptacle 104 while the apparatus 100 is secured to the leash attachment 400, as described above. Of course, the fasteners 124A and 124B may be opened at any time to disassociate the retractable leash attachment 400 from the apparatus 100 (e.g., when the user wishes to use a different leash).

The fasteners 124 and 126 may also allow for other leashes to be coupled to the apparatus 100. For example, FIG. 8 shows the apparatus 100 being removably coupled to a standard leash 600. As is known, the standard leash 600 has a handle 602 and a belt 604. To secure the standard leash 600 to apparatus 100, the user may: (a) pass one of the fasteners 124 through the handle 602 and close same; and (b) secure the other of the fasteners 124 around the leash 600, to cause the standard leash 600 to be firmly secured to the apparatus 100. The user may then hold the handle 602 while walking the pet (see FIG. 8), and the apparatus 100 may remain secured to the leash 600 as desired. The user may use the apparatus 100 to collect and dispose of the pet's fecal matter in line with the disclosure herein. The artisan will appreciate that the fecal matter may be collected and disposed while the standard leash 600 is coupled to the apparatus 100.

The fastening members 124 and 126, which are described above as being configured for the securement of different types of leashes, may in embodiments be usable to secure the apparatus 100 to a baby stroller, a dog harness, a belt loop, etc. In embodiments, the sleeve 102 may include a carabiner to allow the user to removably secure one or more objects to the sleeve 102.

The sleeve 102 may in embodiments have pockets (e.g., zippered or other pockets) for storing objects such as keys, cellphones, and the like. In some embodiments, the sleeve 102 may further comprise one or more pockets specifically configured (e.g., sized) to store a hand-sanitizer bottle, a flashlight, keys, etc. The pockets may be affixed using a locking member (e.g., a hook and loop locking member) or may be sown onto the sleeve 102. The pockets may be internal (i.e., situated within the sleeve cavity 114) or be disposed on the outer surface of the sleeve 102.

Thus, as has been described, the apparatus 100 may allow a user to conveniently collect and dispose of a pet's waste. Many different arrangements of the various components depicted, as well as components not shown, are possible without departing from the spirit and scope of the present invention. The artisan will hence appreciate that the embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations. Not all steps described herein need be carried out in the specific order described.

The invention claimed is:

1. An apparatus for collecting and disposing pet waste, comprising:
    an elastic sleeve comprising neoprene having a cylindrical body, a cover disposed above said body, and an openable member; said body and said cover collectively defining a cavity; said body having a terminal end that is open; said cover having an eyelet; said cavity being uninterrupted and being accessible via each of said terminal end, said eyelet, and said openable member; and
    a receptacle configured to be removably secured within said cavity; said receptacle having a closed end on one side and a lid comprising a cap on the other; said cap having a snap projection and said lid comprising a snap groove; said snap projection and said snap groove configured to collectively allow said cap to be snapped open and closed;
    wherein:
    a length of said receptacle is greater than a length of said body such that when said receptacle is removably secured within said cavity: (a) at least a part of said lid extends beyond said terminal end; and (b) said closed end is adjacent said openable member to allow for a roll of waste bags to be situated on said closed end; and
    said eyelet is configured to allow for the dispensation of one waste bag in said roll of waste bags.

2. The apparatus of claim 1, further comprising a projecting fastener at a back side of said sleeve.

3. The apparatus of claim 1, further comprising a reflective band proximate said terminal end of said sleeve.

4. The apparatus of claim 3, wherein said sleeve comprises an indicia portion configured to receive indicia.

5. The apparatus of claim 4, wherein said indicia portion is magnetized.

6. The apparatus of claim 1, further comprising at least two fasteners on said sleeve; said at least two fasteners configured for the securement of a retractable leash attachment after a locking strip is adhered to a belt containing portion of said retractable leash attachment.

7. The apparatus of claim 6, wherein said at least two fasteners include a first type of fastener that projects from said sleeve and a second type of fastener that extends along a length of said sleeve.

8. The apparatus of claim 6, wherein said receptacle has a body which is transparent.

9. The apparatus of claim 8, wherein said openable member is a zipper.

10. The apparatus of claim 1, wherein said eyelet includes an opening and a grommet.

11. An apparatus for collecting and disposing pet waste, comprising:
    a sleeve having a body, a cover disposed above said body, and an openable member beneath said cover; said body and said cover collectively defining a cavity; said body having a terminal end that is open; said cavity being uninterrupted and being accessible via each of said terminal end, said eyelet, and said openable member; and
    a receptacle configured to be removably secured within said cavity; said receptacle having a closed end on one side and a lid comprising a cap on the other; said cap having a snap projection and said lid comprising a snap groove; said snap projection and said snap groove configured to collectively allow said cap to be snapped open and closed;
    wherein, a length of said receptacle is greater than a length of said body such that when said receptacle is removably secured within said cavity: (a) at least a part of said lid extends beyond said terminal end; and (b) said closed end is adjacent said openable member to allow for a roll of waste bags to be situated on said closed end.

12. The apparatus of claim 11, wherein said openable member extends about halfway around said body.

13. The apparatus of claim 11, further comprising a projecting fastener at a back side of said sleeve.

14. The apparatus of claim 11, further comprising a reflective band proximate said terminal end of said sleeve.

15. The apparatus of claim 11, wherein said sleeve comprises an indicia portion configured to receive indicia.

16. The apparatus of claim 15, wherein said indicia portion is magnetized.

17. The apparatus of claim 11, further comprising at least two fasteners on said sleeve; said at least two fasteners configured for the securement of a retractable leash attachment after a locking strip is adhered to a belt containing portion of said retractable leash attachment.

18. A method of collecting and disposing of pet waste, comprising:
providing a waste collection apparatus, comprising:
an elastic sleeve having a cylindrical body, a cover disposed above said body, an openable member, and at least two fastening members; said body and said cover collectively defining a cavity; said body having a terminal end that is open; said cover having an eyelet; said cavity being uninterrupted and being accessible via each of said terminal end, said eyelet, and said openable member; and
a receptacle configured to be removably secured within said cavity; said receptacle having a closed end on one side and a lid comprising a cap on the other;
situating said receptacle within said cavity such that said cap faces away from said cover;
securing a locking strip on a housing of a retractable leash attachment; and
securing said retractable leash attachment to said elastic sleeve such that one of said at least two fastening members passes through an opening in a handle of said retractable leash attachment and another of said at least two fastening members is secured to said locking strip.

19. The method of claim 18, wherein said cap is hingedly coupled to said lid.

20. The method of claim 19, further comprising closing said cap by inserting a snap projection in said cap in a snap groove in said lid.

* * * * *